United States Patent [19]

Berlin et al.

[11] 3,805,190

[45] Apr. 16, 1974

[54] PHOTOELECTRIC DEVICE FOR GENERATING AND FILTERING LOW-FREQUENCY HARMONIC OSCILLATIONS

[76] Inventors: German Semenovich Berlin, 5 Parkovaya ulitsa 42, kv. 95; Nikolai Akimovich Potapov, 2 Sokolnicheskaya ulitsa, 8, kv. 7; Dmitry Dmitrievich Shenker, Oxkaya ulitsa, 28, kv. 29, all of Moscow, U.S.S.R.

[22] Filed: Oct. 18, 1972

[21] Appl. No.: 298,633

[52] U.S. Cl. ............ 331/116 M, 250/232, 331/156, 333/71

[51] Int. Cl. .......................... H03b 5/30, H03h 9/00

[58] Field of Search ........... 331/107 R, 116 M, 156; 310/25; 333/71; 250/232

[56] References Cited

UNITED STATES PATENTS

| | | | |
|---|---|---|---|
| 1,979,296 | 11/1934 | Sweeney | 331/156 X |
| 3,178,579 | 4/1965 | Zuckerbraun | 250/232 X |

*Primary Examiner*—Herman Karl Saalbach
*Assistant Examiner*—Siegfried H. Grimm
*Attorney, Agent, or Firm*—Eric H. Waters

[57] ABSTRACT

Photoelectric device for generating low-frequency harmonic oscillation, comprising a mechanical oscillator and an electromechanical drive, the latter being in the form of a coil with a magnetized core, for exciting the oscillator, a source of light and a photoelectric transducer making up a system for measuring the oscillation, wherein the mechanical oscillator is in the form of a tuning fork, there being positioned in the path of the light flux from the source of light toward the transducer e.g., a photodiode, at least one pair of grids of which one is rigidly connected with one of the tines of the tuning fork. The device is useful as an oscillator and as a filter.

2 Claims, 3 Drawing Figures

PHOTOELECTRIC DEVICE FOR GENERATING AND FILTERING LOW-FREQUENCY HARMONIC OSCILLATIONS

The present invention relates to generators of electric oscillation within a tonal range, employed in radio engineering and electronics, in automatic and remote control systems, and, more particularly, to photoelectric devices for generating low-frequency harmonic oscillation.

There are known photoelectric devices for generating low-frequency harmonic oscillation, comprising a mechanical oscillator serving as an oscillating member the movable body whereof is a tensioned string, an electromechanical drive adapted to excite oscillation of this mechanical oscillator, a source of light and a photoelectric transducer serving as a system for measuring the oscillation of this mechanical oscillator.

A disadvantage of these photoelectric devices for generating low-frequency harmonic oscillation is that, on account of a relatively low response of the photoelectric transducer to the displacement of the movable body of the mechanical oscillator, there arises a necessity of incorporating a feedback amplifier, which complicates the circuitry and construction of the devices for generating low-frequency harmonic oscillation and raises their cost.

A further disadvantage of the abovespecified photoelectric devices for generating low-frequency harmonic oscillation is that they require additional measures aimed at stabilization of the amplitude of the oscillation being generated, this being one of the binding conditions of obtaining highly stable oscillation.

It is an object of the present invention to provide a photoelectric device for generating low-frequency harmonic oscillation, which should require no feedback amplifier and which should ensure automatic stabilization of the amplitude of the oscillation.

This and other objects are attained in a photoelectric device for generating low-frequency harmonic oscillation, comprising a mechanical oscillator serving as an oscillating member, an electromechanical drive adapted to excite the oscillation of said mechanical oscillator, a source of light and a photoelectric transducer serving as a system for measuring the oscillation of said mechanical oscillator, in which device, in accordance with the present invention, said mechanical oscillator includes a tuning fork, there being positioned in the path of the light flux from said source of light toward said photoelectric transducer at least two grids of which one is rigidly connected with one of the tines of said tuning fork.

It is advisable that in a photoelectric device for generating low-frequency harmonic oscillation embodying the invention, the other one of said two grids be rigidly connected with the other one of said tines of said tuning fork. The inventive device can be used both as an oscillator and a filter.

The herein-disclosed photoelectric device for generating low-frequency harmonic oscillation offers high stability of the output signal (the instability being below $10^{-6}$ per hour) owing to the low amplitude of oscillation and high dependability of the tuning fork, to the absence of any operative connection between the tuning fork and the system measuring its oscillation, as well as to the arrangement of the constituent members of the photoelectric device within an evacuated envelope.

The herein-disclosed photoelectric device for generating low-frequency harmonic oscillation features a simple and economical connection circuitry needing no additional feedback amplifier, as well as a simple construction opening a way for unification.

The present invention will be further described in connection with embodiments thereof, with reference to the accompanying drawings, wherein.

Figure 3:
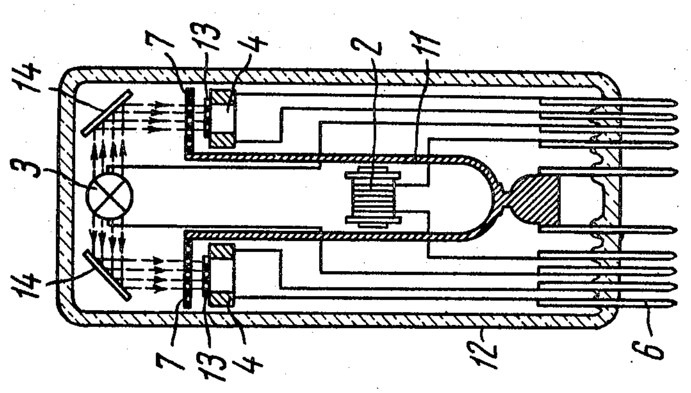
FIG. 3 illustrates schematically another embodiment of a photoelectric device for generating low-frequency harmonic oscillation, in accordance with the invention.

Referring now to the appended drawings, one embodiment of the inventive photoelectric device serves as an oscillator and comprises a mechanical oscillator including a tuning fork 1 (FIG. 1) made of a ferromagnetic material having low temperature factors of elastic modulus and linear thermal expansion. The tuning fork 1 serves as the oscillating member of the herein-disclosed photoelectric device for generating low-frequency harmonic oscillation. Situated intermediate of the tines of the tuning fork 1 is a coil 2 with a magnetized core, acting as the electromechanical drive exciting oscillation of the tuning fork 1.

Also situated intermediate of the tines of the tuning fork 1 is a source of light 3 in the form of an incandescent lamp. However, the light source 3 may also be in the form of an infra-red radiator, a gas-discharge device, a luminescent lamp, etc. The herein-disclosed photoelectric device for generating low-frequency harmonic oscillation further includes a photoelectric transducer 4 including a photodiode. However, the photoelectric transducer may be also in the form of a phototransistor, a photoresistor, etc.

The light source 3 and the photoelectric transducer 4 make up a system measuring the oscillation of the tuning fork 1. The tuning fork 1, the coil 2, the light source 3 and the photoelectric transducer 4 are enclosed within an evacuated glass envelope 5. The envelope 5 is provided with electric leads 6 connectable to a voltage source and connected electrically, respectively, with the abovelisted elements.

Soldered to the end portions of the tines of the tuning fork 1 are one-dimensional arrays or grids 7 positioned to intercept the light flux coming from the light source 3 toward the photoelectric transducer 4. The grids 7 are arranged in an overlapping fashion, the respective slits thereof half-closing, or half-overlapping each other, the period corresponding to the amplitude of oscillation of the tuning fork 1. In the present disclosure, the expression "period" is meant to define the spacing between the adjacent slits of the grid.

Shown in the circuit diagram of the herein-disclosed photoelectric device for generating low-frequency harmonic oscillation are the light source 3 (FIG. 2) supplied from a D.C. voltage source 8, as well as serially connected photoelectric transducer 4, coil 2 and a D.C. voltage source 9. The output voltage is sent through a dividing capacitor 10.

Another embodiment of the photoelectric device serves as a filter and comprises a tuning fork 11, a coil 2 with a magnetized core, positioned intermediate of the tines of the tuning fork 11, a source of light 3 in the form of an incandescent lamp and a pair of photoelectric transducers 4, each in the form of a photodiode. All the abovelisted elements are enclosed within an evacuated glass envelope 12 provided with electric leads 6 energized during the operation of the device. Each tine of the tuning fork 11 has soldered thereto an array, or grid 7, whereas each one of the two photodiodes has soldered thereto an array, or grid 13 overlapping the grid 7. The light flux thrown by the light source 3 is directed in two paths with the help of mirrors 14.

After having been reflected by the respective mirror 14, each one of the two light fluxes passes through the pair of overlapping grids 7 and 13 and falls upon the respective photodiode.

The first embodiment of the herein-disclosed photoelectric device (see FIGS. 1 and 2) operates as follows. When the external voltage sources 8 and 9 (FIG. 2) are connected to the device, electric fluctuations inherent in any electric circuit excite initial oscillation of the current. The varying current acts through the coil 2 (FIG. 1) upon the tuning fork, displacing its tines in relation to the stationary light source 3 and to the photodiode, the tines of the tuning fork 1 moving normally in respect of the light flux. With the tines being thus displaced, the degree of screening of the photodiode by the grids 7 varies periodically, and the internal resistance of the photodiode varies accordingly, whereby the value of the current flowing through the photodiode varies too. These current variations in turn act through the coil 2 upon the tuning fork 1, and so on.

Figure 2:
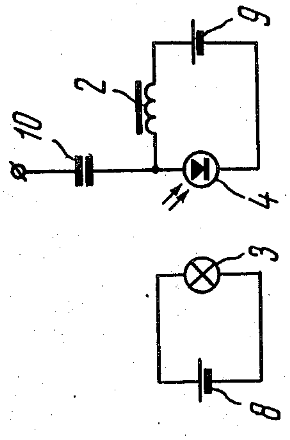
FIG. 2 is a circuit diagram of the herein-disclosed photoelectric device.

In this way, there is effected positive feedback, resulting in sustained oscillation. Finally, there is established a stationary oscillatory mode of operation with the natural frequency of the tuning fork and with the amplitude depending on the period of the overlapping grids 7. The output signal voltage is sent through the dividing capacitor 10 (FIG. 2). This embodiment can be employed as a reference frequency (oscillator).

A theoretical analysis of the abovedescribed process shows that the frequency of the oscillation is equal to the natural frequency of the tuning fork 1 and is characterized by high stability.

The stability of the frequency of the tuning fork and the operational reliability thereof are considerably stepped up by positioning the tuning fork in vacuum. The employment of the system of grids 7 enables to lower considerably the threshold of excitation of oscillation and to bring down the power required for generation of low-frequency harmonic oscillation.

Figure 1:
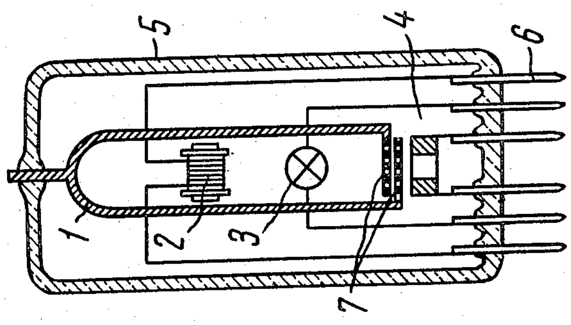
FIG. 1 illustrates schematically one of the embodiments of a photoelectric device for generating low-frequency harmonic oscillation, in accordance with the invention.

As to the second embodiment of the photoelectric device, illustrated in FIG. 3, operates in a manner similar to the one described hereinabove in connection with FIG. 1, the only difference being that the relative position of each pair of grids 7 and 13 is so adjusted that upon each oscillation of the tuning fork, the degree of transparency of each pair of grids 7 and 13 varies in counterphase. This results in improved linearity of the current flowing through the coil 2 and, therefore, in improved stability of the harmonic oscillation being generated. This embodiment can serve as a narrow-band filter.

A photoelectric device for generating low-frequency harmonic oscillation according to the invention can thus be employed both as a source of highly stable reference frequency, and as a narrow-band active low-frequency filter. In the latter case an input signal is fed to the coil 2 of the electromechanical drive of the device, while the output signal is derived directly from the photoelectric transducer.

What is claimed is :

1. A photoelectric device for generating low-frequency harmonic oscillation, comprising: a mechanical oscillator including a tuning fork and serving as an oscillating member; an electromechanical drive for exciting the oscillation of said mechanical oscillator; a source of light and a photoelectric transducer, serving as a system measuring the oscillation of said mechanical oscillator; at least two grids positioned in the path of the light flux from said source of light toward said photoelectric transducer, one of said grids being rigidly connected with one of the tines of said tuning fork.

2. The photoelectric device as claimed in claim 1, wherein the other one of said grids is rigidly connected to the other one of said tines of the tuning fork.

* * * * *